United States Patent
Bunch et al.

(10) Patent No.: US 8,022,859 B2
(45) Date of Patent: Sep. 20, 2011

(54) SYSTEMS AND METHODS FOR USING NEXRAD INFORMATION TO VERIFY WEATHER RADAR INFORMATION

(75) Inventors: Brian P. Bunch, Snohomish, WA (US); Michael M. Grove, Snohomish, WA (US); Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 172 days.

(21) Appl. No.: 12/476,726

(22) Filed: Jun. 2, 2009

(65) Prior Publication Data

US 2010/0302094 A1 Dec. 2, 2010

(51) Int. Cl.
*G01S 13/00* (2006.01)

(52) U.S. Cl. .................. 342/26 R; 342/26 A; 342/26 B; 342/26 C; 342/26 D

(58) Field of Classification Search ................ 342/26 R, 342/26 A, 26 B, 26 C, 26 D
See application file for complete search history.

(56) References Cited

U.S. PATENT DOCUMENTS

| | | | |
|---|---|---|---|
| 4,050,067 A | 9/1977 | Elmore, Jr. | |
| 4,170,006 A | 10/1979 | Falk | |
| 4,660,044 A | 4/1987 | Lavelle | |
| 4,963,036 A | 10/1990 | Drisko et al. | |
| 5,166,688 A | 11/1992 | Moreira | |
| 5,196,854 A | 3/1993 | Mathews | |
| 5,198,819 A * | 3/1993 | Susnjara | 342/26 B |
| 5,265,024 A * | 11/1993 | Crabill et al. | 701/200 |
| 5,363,107 A | 11/1994 | Gertz et al. | |
| 5,379,215 A * | 1/1995 | Kruhoeffer et al. | 702/3 |
| 5,530,909 A | 6/1996 | Simon et al. | |
| 5,657,009 A * | 8/1997 | Gordon | 340/968 |
| 5,988,862 A | 11/1999 | Kacyra et al. | |
| 6,043,756 A * | 3/2000 | Bateman et al. | 340/945 |
| 6,044,336 A | 3/2000 | Marmarelis et al. | |
| 6,148,261 A | 11/2000 | Obradovich et al. | |
| 6,232,913 B1 | 5/2001 | Lehtinen | |
| 6,246,468 B1 | 6/2001 | Dimsdale | |
| 6,330,523 B1 | 12/2001 | Kacyra et al. | |

(Continued)

FOREIGN PATENT DOCUMENTS

WO W09940457 A1 12/1999

OTHER PUBLICATIONS

NexRad Radar: View the Big Picture up to 500 Miles Ahead and Fly the Smartest Route Between Two Points, Echo Flight, https://www.echoflight.com/nexrad.html., 1 page, printed Apr. 28, 2009.

(Continued)

*Primary Examiner* — Thomas H Tarcza
*Assistant Examiner* — Peter Bythrow
(74) *Attorney, Agent, or Firm* — Lowe Graham Jones PLLC

(57) ABSTRACT

Systems and methods distinguish weather radar returns from terrain radar returns. An exemplary embodiment receives a radar return from a weather radar system on board an installation vehicle, receives ground-based weather radar information, compares a location of the radar return received from the onboard weather radar system with a corresponding location in the received ground-based, and determines that the radar return received from the onboard weather radar system is a weather radar return when a location in the received ground-based weather radar information indicates a presence of weather at the location of the radar return.

20 Claims, 4 Drawing Sheets

U.S. PATENT DOCUMENTS

| | | | |
|---|---|---|---|
| 6,381,538 B1* | 4/2002 | Robinson et al. | 701/211 |
| 6,420,698 B1 | 7/2002 | Dimsdale | |
| 6,441,773 B1* | 8/2002 | Kelly et al. | 342/26 R |
| 6,448,922 B1* | 9/2002 | Kelly | 342/26 R |
| 6,456,226 B1* | 9/2002 | Zheng et al. | 342/26 R |
| 6,473,079 B1 | 10/2002 | Kacyra et al. | |
| 6,501,392 B2* | 12/2002 | Gremmert et al. | 340/971 |
| 6,512,518 B2 | 1/2003 | Dimsdale | |
| 6,512,993 B2 | 1/2003 | Kacyra et al. | |
| 6,563,452 B1* | 5/2003 | Zheng et al. | 342/26 R |
| 6,583,751 B1 | 6/2003 | Ferretti et al. | |
| 6,667,710 B2 | 12/2003 | Cornell et al. | |
| 6,707,415 B1 | 3/2004 | Christianson | |
| 6,744,382 B1* | 6/2004 | Lapis et al. | 340/971 |
| 6,771,207 B1 | 8/2004 | Lang | |
| 6,828,922 B1* | 12/2004 | Gremmert et al. | 340/949 |
| 6,865,452 B2* | 3/2005 | Burdon | 701/3 |
| 6,917,860 B1* | 7/2005 | Robinson et al. | 701/3 |
| 6,977,608 B1 | 12/2005 | Anderson et al. | |
| 7,027,898 B1* | 4/2006 | Leger et al. | 701/14 |
| 7,039,505 B1* | 5/2006 | Southard et al. | 701/3 |
| 7,081,834 B2* | 7/2006 | Ruokangas et al. | 340/945 |
| 7,085,562 B1 | 8/2006 | Holder et al. | |
| 7,205,928 B1* | 4/2007 | Sweet | 342/26 B |
| 7,365,673 B2 | 4/2008 | Makkapati et al. | |
| 7,379,816 B2* | 5/2008 | Southard et al. | 701/300 |
| 7,463,955 B1* | 12/2008 | Robinson et al. | 701/3 |
| 7,467,031 B2* | 12/2008 | King | 701/4 |
| 7,471,995 B1* | 12/2008 | Robinson | 701/3 |
| 7,474,250 B2 | 1/2009 | Makkapati et al. | |
| 7,515,088 B1 | 4/2009 | Woodell et al. | |
| 7,579,978 B1* | 8/2009 | Finley | 342/33 |
| 7,633,428 B1* | 12/2009 | McCusker et al. | 342/26 B |
| 7,646,328 B2 | 1/2010 | Makkapati et al. | |
| 7,728,758 B2 | 6/2010 | Varadarajan et al. | |
| 7,817,078 B2* | 10/2010 | Bunch | 342/26 B |
| 7,821,448 B2 | 10/2010 | Mahapatra et al. | |
| 2002/0039072 A1* | 4/2002 | Gremmert et al. | 340/945 |
| 2003/0016155 A1* | 1/2003 | Szeto et al. | 342/26 |
| 2004/0183695 A1 | 9/2004 | Ruokangas et al. | |
| 2006/0145912 A1 | 7/2006 | Makkapati et al. | |
| 2006/0202886 A1 | 9/2006 | Mahapatra et al. | |
| 2008/0040038 A1* | 2/2008 | Southard et al. | 701/300 |
| 2008/0158049 A1* | 7/2008 | Southard et al. | 342/26 R |

OTHER PUBLICATIONS

R.C. Wilson et al., "A Radar Reflectance Model for terrain Analysis Using Shape From Shading," Proceedings of the International Conference on Image Analysis for Processing, pp. 868-873, Sep. 27-29, 1999.

Control Vision Corp.; Anywhere Wx—Aviation Weather; http://web.archive.org/web/20070202054903/http:// www.anywheremap.com/aviation-weather.aspx; 2005.

Brian P. Bunch et al.; Systems and Methods for Preparing Ground-Based Weather Radar Information for Use in an Installation Device; U.S. Appl. No. 12/571,132, filed Sep. 30, 2009.

Jason Fritz and V. Chandrasekar, Simultaneous Observations of a Tropical Cyclone from Dual-Pol TerraSAR-X and Ground Based Weather Radar, Colorado State University Electrical & Computer Engineering Dept. 1373 Campus Delivery, Fort Collins, CO 80523-1373, Radar Conference, 2009 IEEE, Piscatahiay , NJ , USA, May 4, 2009, pp. 1-6.

Richard Mamrosh, "Aircraft Weather Observations Improve Forecasts," The Front, vol. 2, No. 2, pp. 7; Jul. 2003.

Rediess et al., "Autonomous Civil Aircraft—The Future of Aviation," Aerospace America, pp. 40-43, Jul. 2006.

H. Paul Stough III, "Aircraft Weather Mitigation for the Next Generation Air Transportation System," NASA Langley Research Center, 15.8, pp. 1-6, Dec. 2004.

Thomas A. Horne, "Future Flight: Links to Tomorrow," AOPA Online, http://www.aopa.org/pilot/features/future0002.html, vol. 43, No. 2, Feb. 2000.

* cited by examiner

SYSTEMS AND METHODS FOR USING NEXRAD INFORMATION TO VERIFY WEATHER RADAR INFORMATION

BACKGROUND OF THE INVENTION

Weather radars, such as found on aircraft or marine vessels, display hazardous weather information based upon analyzed radar returns. Radar return information corresponding to detected hazardous weather information is presented to the crew of the aircraft or marine vessel on a display, typically using a plan view showing a geographic area over which the aircraft or vessel is traversing.

However, weather radars have a limited effective range. At the farther extents of the range of the weather radar, the weather radar system has difficulty distinguishing between weather radar returns and terrain radar returns. This difficulty relates to weather and terrain being close to each. Thus, an emitted radar signal may be incident on both weather and terrain. Accordingly, the weather radar system may receive return signals from both the weather and the terrain.

For example, an aircraft at cruising altitude over Kansas may have an effective radar range of about 300 nautical miles based upon the curvature of the earth and the signal strength of the returned radar signal. This effective range of the onboard radar may be referred to as the radar horizon. However, at the far extent of this range, the onboard radar may have difficulties distinguishing between valid weather radar returns and terrain radar returns, such as radar returns caused by mountains. Here, the vertical coverage range of an emitted radar signal is relatively large at the radar horizon. Accordingly, the weather radar system may receive return signals from both the weather and the terrain.

In some situations, the radar range can be limited, or blocked, by terrain. For example, the effective range of the weather radar will be significantly reduced when mountain ranges block the emitted radar signals. As another example, if a marine vessel is sailing around a point or peninsula with mountains, the marine vessel's weather radar would not be able to detect weather on the far side of the point or peninsula. Here, the onboard radar system cannot see "over" the mountains. Further, it may be difficult for the weather radar system to distinguish between radar returns from the mountain peaks and weather radar returns caused by weather that is on, or just behind, the mountain peaks. In such situations, the weather radar system may receive return signals from both the weather and the terrain.

In yet other situations, the radar range can be limited by a low altitude of the aircraft. When an aircraft is taking off or landing, the low altitude of the aircraft will result in a limited radar range since the earth horizon is relatively close to the aircraft (as compared to the far range of the earth horizon when the aircraft is at cruising altitude). Thus, it may be difficult to identify radar returns caused by weather which lies along the relatively close-range earth horizon. Accordingly, the weather radar system may receive return signals from both the weather and the terrain. Further, lower elevation weather is not detectable since it lies below the earth horizon during takeoff or landing.

Accordingly, the weather radar may not be able to reliably differentiate between weather radar returns and terrain radar returns along the radar horizon of the weather radar. Accordingly, it is desirable to improve the ability to differentiate between weather radar returns and terrain radar returns along the radar horizon of an aircraft's or marine vessel's weather radar so that the crew of the aircraft or vessel have more time to respond to adverse weather conditions.

SUMMARY OF THE INVENTION

An onboard weather radar systems and methods in an installation vehicle that distinguishes weather radar returns from terrain radar returns are disclosed. An exemplary embodiment has an onboard weather radar antenna that detects a radar return from weather and from terrain, an onboard transceiver that receives ground-based weather radar information, and an onboard processing system coupled to the onboard weather radar antenna and the onboard transceiver. The onboard processing system compares a location of the radar return received from the onboard weather radar system with a corresponding location in the received ground-based weather radar information, and determines that the radar return received from the onboard weather radar system is a weather radar return when a location in the received ground-based weather radar information indicates a presence of weather at the location of the radar return.

In accordance with further aspects, an exemplary embodiment receives a radar return from a weather radar system on board an installation vehicle, receives ground-based weather radar information, compares a location of the radar return received from the onboard weather radar system with a corresponding location in the received ground-based weather radar information, and determines that the radar return received from the onboard weather radar system is a weather radar return when a location in the received ground-based weather radar information indicates a presence of weather at the location of the radar return.

BRIEF DESCRIPTION OF THE DRAWINGS

Preferred and alternative embodiments are described in detail below with reference to the following drawings.

DETAILED DESCRIPTION OF THE PREFERRED EMBODIMENT

One or more ground-based weather radar systems communicate radar information to an installation vehicle, such as an aircraft or marine vessel, equipped with an embodiment of the airborne weather radar information system 100. The received ground-based weather radar information is processed and used to differentiate radar returns caused by weather (also referred to herein as weather radar returns) and radar returns caused by terrain (also referred to herein as terrain radar returns or ground radar returns). In some situations, the ground-based weather radar information may be included with the display of weather detected by the installation vehicle's onboard weather radar. The term "weather" generally refers to any type of weather radar detectable weather phenomena, such as, but not limited to, storm cells, turbulence regions, lightning, precipitation, hail, snow, wind shear, icing conditions, and the like that the installation vehicle may encounter.

An example of ground-based weather radar information in the United States is the NEXRAD (next generation radar) weather information collected by a plurality of ground-based weather radar stations forming the NEXRAD network. Other examples of sources of ground-based weather radar information include single ground radar sites, or networks of coordinated ground-based radar sites, such as, but not limited to, the PANTHERE system in France.

Figure 1:
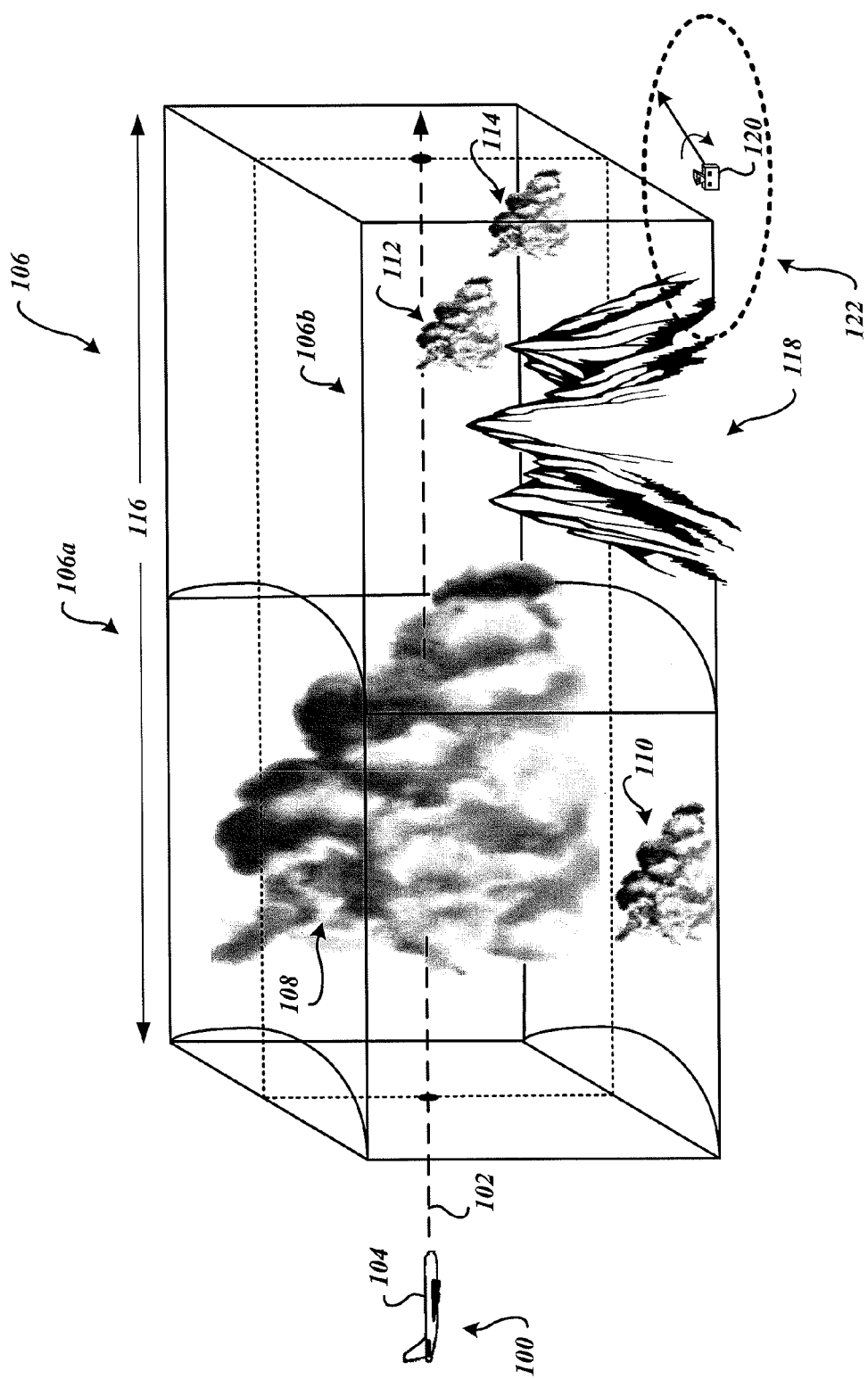
FIG. 1 is a perspective view of a portion of a planned flight path of an installation aircraft through a region of space having a plurality of storm cells, some of which are along the radar horizon or are beyond the effective range of the installation aircraft's onboard weather radar.

FIG. 1 is a perspective view of a portion of a planned flight path 102 of an installation aircraft 104 through a region of space 106 having a plurality of storm cells 108, 110, 112, 114, some of which are along the radar horizon or are beyond the effective range of the installation aircraft's onboard weather radar. In FIG. 1, the illustrated region of space 106a is within the effective detection range 116 of the weather radar of the installation aircraft 104. Weather radar returns from the region of space 106a can be distinguished from radar returns caused by terrain. Here, the illustrated storm cells 108, 110 are within the effective detection range 116 of the onboard weather radar of the installation aircraft 104. Thus, radar returns from the storm cell 108, 110 are clearly distinguishable from other radar returns.

However, at the outer extents of the weather radar of the installation aircraft 104, an ambiguity region 106b exists where weather radar returns are difficult to distinguish from terrain radar returns. Further, the mountain range 118 simply blocks out and prevents detection of weather that is behind the mountain range 118. Thus, weather radar returns from the storm cell 112, which is near the peaks of the mountain range 118, may be difficult to distinguish from the terrain radar returns caused by the mountain range 118 because the storm cell 112 lies along the radar horizon of the onboard weather radar of the installation aircraft 104. Further, the storm cell 114 lies beyond the effective detection range 116 of the installation aircraft's onboard weather radar since it is completely blocked by the mountain range 118. Accordingly, the installation aircraft 104 cannot detect the storm cell 114.

A ground-based weather radar station 120 is located relatively near the storm cells 112, 114. The ground-based weather radar station 120 can reliably detect weather in a region generally defined by a radius 122 about the ground-based weather radar station 120. Thus, the storm cells 112, 114 are detectable by the ground-based weather radar system.

Figure 2:
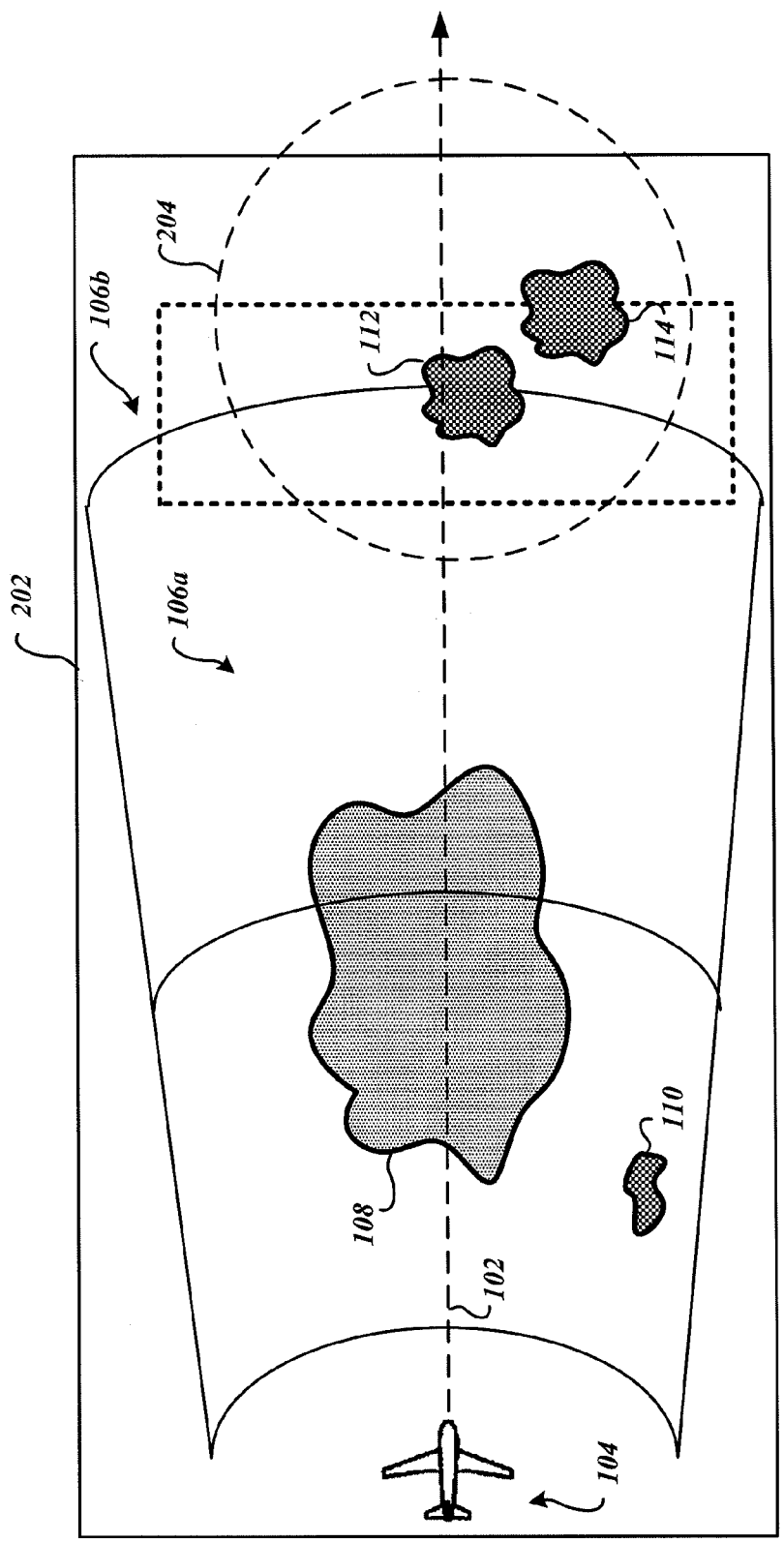
FIG. 2 is a conceptual weather radar display of the effective range of the aircraft's onboard weather radar and a ground-based weather radar display for the area that is along the radar horizon or is beyond the effective range of the aircraft's weather radar.

FIG. 2 is a conceptual weather radar display 202 of the effective range of the aircraft's onboard weather radar and a ground-based weather radar display 204 of the effective range of the ground-based weather radar system at the ground-based weather radar station 120. The weather radar displays 202, 204 are plan views of detected weather within the range of the weather radars of the aircraft 104 and ground-based weather radar station 120, respectively. Similar to FIG. 1, reference numerals of the icons of FIG. 2 correspond to the reference numerals of FIG. 1.

The images of the weather radar displays 202, 204 may be based upon two-dimensional (2-D) databases which are filled with radar return information (using bins, for example, based on range and bearing values with respect to the current location of the aircraft 104). In other embodiments, the presented weather radar displays 202, 204 may be based upon three-dimensional (3-D) databases which are filled with radar return information (using 3-D bins or voxels, for example, based on range, azimuth, and bearing values with respect to the current location of the aircraft 104). An exemplary embodiment of a 3-D weather radar system is implemented in accordance with the commonly assigned U.S. Pat. No. 6,667, 710, filed on Feb. 19, 2002, to Cornell et al., which is incorporated herein by reference in its entirety.

The iconic images corresponding to the storm cells 108, 110, 112, and 114 that are displayed on the weather radar displays 202, 204 comprise picture information generally described as colored regions that define size and relative position of detected weather. Color, intensities, and/or fill patterns indicate various attributes of the weather, such as severity levels and/or weather type.

Embodiments of the airborne weather radar information system 100 receive ground-based weather information from the ground-based weather radar station 120. The ground-based weather radar information is communicated to the installation aircraft 104 using a suitable communication channel. The ground-based weather radar information may be communicated directly to the installation aircraft 104, or may be relayed to the installation aircraft 104 via other ground stations and/or remote aircraft (not shown).

The current location of the ground-based weather radar station 120, and/or the location of detected weather (latitude, longitude, and/or elevation), is included with the communicated ground-based weather radar information. The ground-based weather radar information may be provided in a 2-D format or a 3-D format. Some embodiments include the time that the ground-based weather radar information was collected.

In this example, weather radar returns (from the storm cell 112) and terrain radar returns (from the mountain range 118) are received by the onboard weather radar. Embodiments of the airborne weather radar information system 100 processes the received ground-based weather radar information to identify the presence (location and extent) of weather detected by the ground-based weather radar station 120. In the simplified illustrative example of FIG. 1, the received ground-based weather radar information is processed and the presence of the storm cell 112 is identified from the ground-based weather radar information. A comparison, correlation, or the like is made between the location of weather radar returns and the ground-based weather radar information (which indicates location and extent of the storm cell 112). Accordingly, the presence of the storm cell 112 is verified by the ground-based weather radar information. Therefore, the airborne weather radar information system 100 is able to distinguish weather radar returns (from the storm cell 112) from terrain radar returns (from the mountain range 118) in the ambiguity region 106b. Based upon the verification provided by the ground-based radar system, the installation aircraft 104 generates a radar display that indicates the storm cell 112 to its crew.

Further, since information corresponding to the location and elevation of the mountain range 118 is retrievable from a database, and the elevation of the aircraft 104 is known, the airborne weather radar information system 100 determines that the onboard weather radar of the installation aircraft 104 cannot see beyond the mountain range 118. That is, blocked regions for which weather radar returns cannot be received are identified. Since the location and extent of the storm cell 114 is identified in the received NEXRAD information, the airborne weather radar information system 100 adds the information pertaining to the storm cell 114 into its weather database, and is therefore able to generate a radar display that indicates the storm cell 114 to its crew.

Figure 3:
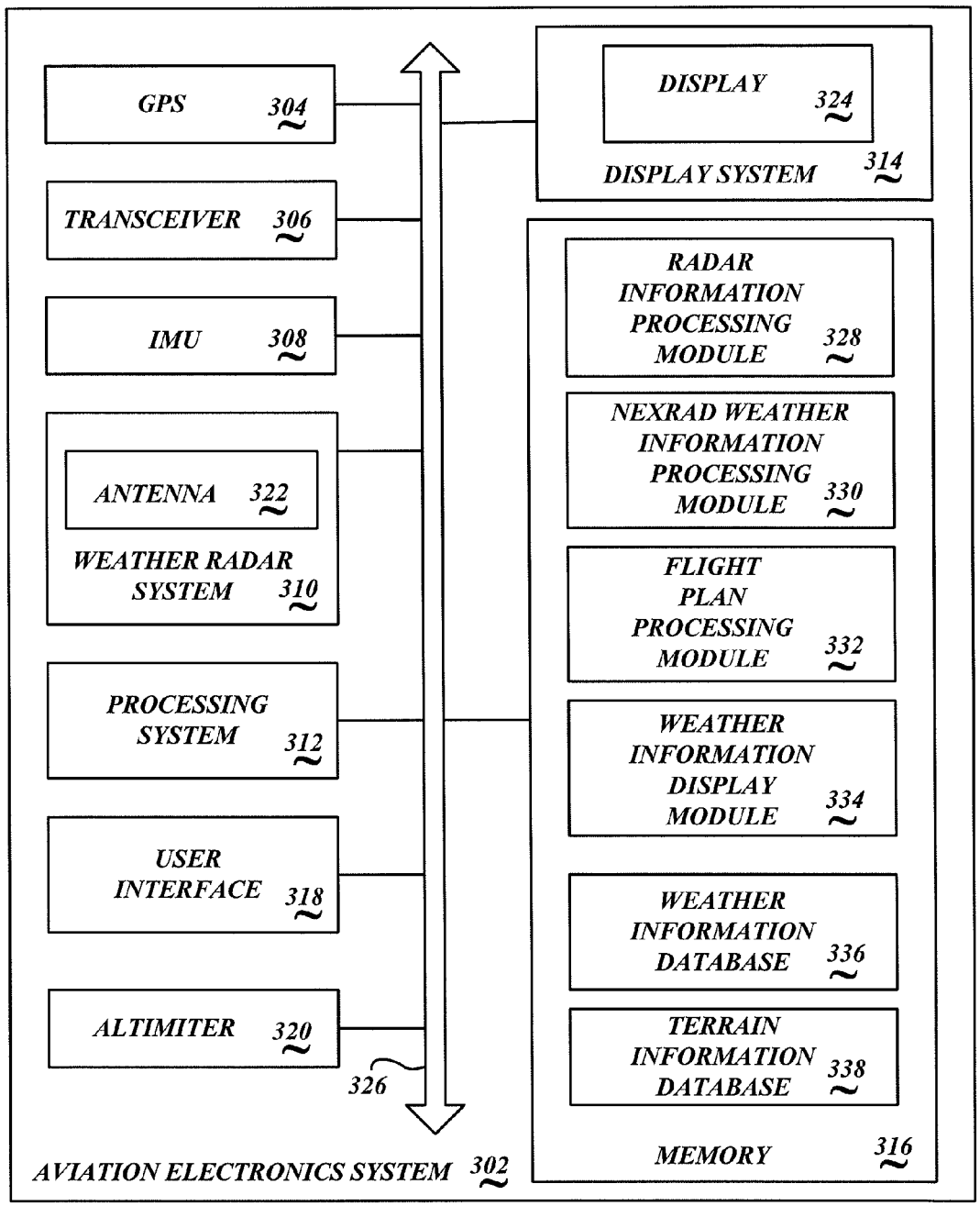
FIG. 3 is a block diagram of an exemplary embodiment of the ground-based weather radar information communication system implemented in an aviation electronics system of the installation aircraft.

In some embodiments, regions beyond the range of the onboard weather radar of the installation aircraft 104, and/or regions that are blocked by terrain, are supplemented with weather information identified in the received ground-based weather radar information. The airborne weather radar information system 100 adds the information pertaining to such long range (undetectable) weather into its weather database, and is therefore able to generate a radar display that indicates the long range weather and/or blocked weather to its crew FIG. 3 is a block diagram of an exemplary embodiment of the airborne weather radar information system 100 implemented in an aviation electronics system 302 of the installation aircraft 104. The aviation electronics system 302 includes a global positioning system (GPS) 304, a transceiver 306, an inertial measurement unit (IMU) 308, a weather radar system 310, a processing system 312, a display system 314, a memory 316, a crew interface 318, and an altimeter 320. The weather radar system 310 includes an antenna 322 that is operable to emit radar signals and receive radar returns. The display system 314 includes a display 324. It is appreciated that the aviation electronics system 302 may not include all of the above component, and/or may include other components and/or systems that are not illustrated or described herein.

The above-described components, in an exemplary embodiment, are communicatively coupled together via communication bus 326. In alternative embodiments of the aviation electronics system 302, the above-described components may be communicatively coupled to each other in a different manner. For example, one or more of the above-described components may be directly coupled to the processing system 312, or may be coupled to the processing system 312 via intermediary components (not shown).

The weather radar system 310 may be any suitable radar system, such as, but not limited to, a weather radar that is operable to detect weather that is located relatively far away from the installation aircraft 104. The antenna 322 is operable to emit radar pulses and to receive weather radar returns (from weather, such as the storm cells 108, 110, 112, 114) and terrain radar returns (from terrain, such as the mountain range 118). A radar return is reflected energy from weather or an object upon which the emitted radar pulse is incident on. The antenna 322 is swept in a back-and-forth motion, in an up and down direction, and/or in other directions of interest, such that the radar system 310 is able to detect weather, and more particularly turbulence, in an area of interest about the aircraft 104. Embodiments of the airborne weather radar information system 100 may be implemented in other types and/or applications of radar, such as marine radar.

The GPS 304 determines the current location of the installation aircraft 104. The altimeter 320 determines altitude of the aircraft. The altimeter 320 may determine altitude based on air pressure and/or radio signals received from sources having precise known elevations, such as an airport. The IMU 308 may also be used to determine the current location and/or altitude, or supplement determination of the current location and/or altitude, of the installation aircraft 104.

The user interface 318 receives input from the crew of the installation aircraft 104. Accordingly, the crew may optionally elect to view only radar information detected by the weather radar system 310, may elect to view the ground-based weather radar information, or to view a combination of both.

Transceiver 306 is a communication device that is operable to receive the NEXRAD weather information from one or more ground-based weather radar stations 120. Any suitable transceiver system or device may be used.

An exemplary embodiment of the airborne weather radar information system 100 comprises a plurality of cooperatively acting modules. The modules are identified as a radar information processing module 328, a ground-based weather radar information processing module 330, a flight plan processing module 332, and a weather information display module 334. Modules 328, 330, 332, 334, reside in the memory 316, and are retrieved and executed by the processing system 312. In other embodiments, the modules 328, 330, 332, 334, may be implemented together as a common module, may be integrated into other modules, or reside in other memories (not shown).

In an exemplary embodiment, a weather information database 336 and a terrain information database 338 are stored in memory 316. In some embodiments, the weather information database 336 includes 3-D weather information. In other embodiments, the weather information database 336 includes 2-D weather information. The terrain information database 338 includes location information and elevation information of terrain over which the installation aircraft 104 is traversing. Alternatively, the weather information database 336 and/or the terrain information database 338 may be implemented with other databases, may be implemented in various formats, such as a buffer or the like, and/or may be implemented in another memory.

The radar information processing module 328 processes radar returns detected by the antenna 322 of the radar system 310 into weather information. Weather radar returns may be associated with various types of weather. The radar information processing module 328 may determine the type of detected weather, and their associated attributes such as location, vertical extent, and/or severity. The determined weather information is saved into the corresponding bins (2-D) or voxels 304 (3-D) in the weather information database 336.

The weather information display module 334 accesses the weather information stored in the weather information database 336 and constructs a displayable image corresponding to a graphical presentation of the local weather information. The displayable image of the weather information is communicated to the display system 314 and is presented on the display 324 as the weather radar display 202 (FIG. 2). The displayable image, in some embodiments, is in the form of bit map data.

As noted above, the onboard weather radar system 310 may have difficulties distinguishing between valid weather radar returns and terrain radar returns for some of the radar returns detected by its antenna 322. When at cruising altitude, the radar horizon may be a relatively long distance from the installation aircraft 104 such that the curvature of the earth and the output signal strength of the emitted radar signal may make it difficult to distinguish between valid weather radar returns and terrain radar returns. When taking off or landing, or when in proximity to mountain ranges, the onboard weather radar system 310 may have difficulties distinguishing between valid weather radar returns and terrain radar returns. In some situations, mountain ranges may simply block the emitted radar signals.

Embodiments of the airborne weather radar information system 100 receive ground-based weather radar information. In regions where the onboard weather radar system 310 may have difficulties distinguishing between valid weather radar returns and terrain radar returns, the presence (or absence) of weather identified in the ground-based weather radar information is used to help distinguish between valid weather radar returns and terrain radar returns. An exemplary embodiment compares a radar return from the weather radar system 310 with a plurality of ground-based weather radar returns in the received ground-based weather radar information. Then, the airborne weather radar information system 100 determines that the radar return is from weather when a location of the radar return corresponds to a location of one of the plurality of returns of the ground-based weather radar information.

The ground-based weather radar information processing module 330 processes received ground-based weather radar information to determine the location and extent of weather detected by the ground-based weather radar station 120 (FIG. 1). The location and extent of the weather detected by the ground-based weather radar station 120 is determined with respect to the current location of the installation aircraft 104. The processed ground-based weather radar information may be saved into the corresponding bins (2-D) or voxels (3-D) in the weather information database 336, and/or saved into another suitable memory or buffer.

When the location of radar returns received by the onboard weather radar system 310 correspond with, match, or otherwise agree with, the location of identified weather of the received ground-based weather radar information, embodiments of the airborne weather radar information system 100 determine whether the radar returns are valid weather radar returns. If the radar returns received by the onboard weather radar system 310 do not correspond with, do not match, or otherwise disagree with detected weather identified in the received ground-based weather radar information, embodiments of the airborne weather radar information system 100 conclude that the radar returns are terrain radar returns.

When the ground-based weather radar information processing module 330 determines that the radar returns are valid weather radar returns, the radar intensity information (or other information) from the valid weather radar return is stored into the weather information database 336 and identified as a valid weather radar return. When the weather information display module 334 accesses the weather information stored in the weather information database 336 and generates a displayable radar image, verified weather radar returns can be included in the radar image that is displayed on the display 324. On the other hand, radar returns identified as terrain radar returns may be omitted.

In some embodiments, radar returns can be verified as valid terrain radar returns based on the terrain information retrieved from the terrain information database 338. Radar returns may be determined to be terrain radar returns (based upon the comparison with the received ground-based weather radar information) by comparing the location of the radar returns with the location and/or elevation information of terrain that resides in the terrain information database 338. These valid terrain radar returns may also be stored in the weather information database 336. The valid terrain radar returns are indicated in a different manner from valid weather radar returns in the displayed radar image. Accordingly, the crew of the installation aircraft 104 appreciates which areas of the displayed radar image correspond to valid weather radar returns and which areas correspond to valid terrain radar returns.

Alternative embodiments may compare radar return information detected by the weather radar system 310 with the weather information identified in the received ground-based weather radar information at other times during the process of detecting weather and generating images for display on the display 324. For example, the stored radar returns from the weather radar system 310 may be retrieved from the weather information database 336, and then compared with the weather information identified in the received ground-based weather radar information. The image information may then be generated for display for verified weather returns.

In another embodiment, image information that is generated from the stored radar returns from the weather radar system 310 may be retrieved from the weather information database 336. Image information may be generated from the weather information identified in the received ground-based weather radar information. Then, the generated image information may be compared to verify valid weather returns.

The optional flight plan processing module 332 processes flight plan information. Flight plans may be predefined and/or entered by the crew. A predefined flight plan typically comprises a plurality of planned flight path segments based upon a series of waypoints. The flight plan information includes geographic location information that defines location of waypoints and/or the flight path segments, and/or planned altitude information. Accordingly, the flight plan may be used to determine regions of space where it is difficult to distinguish weather radar returns from terrain radar returns, or that is beyond the detection range of the weather radar system 310. The determined regions of space associated with the flight plan are then used to filter, or otherwise select, the ground-based weather radar information that lies along the planned flight path.

Figure 4:
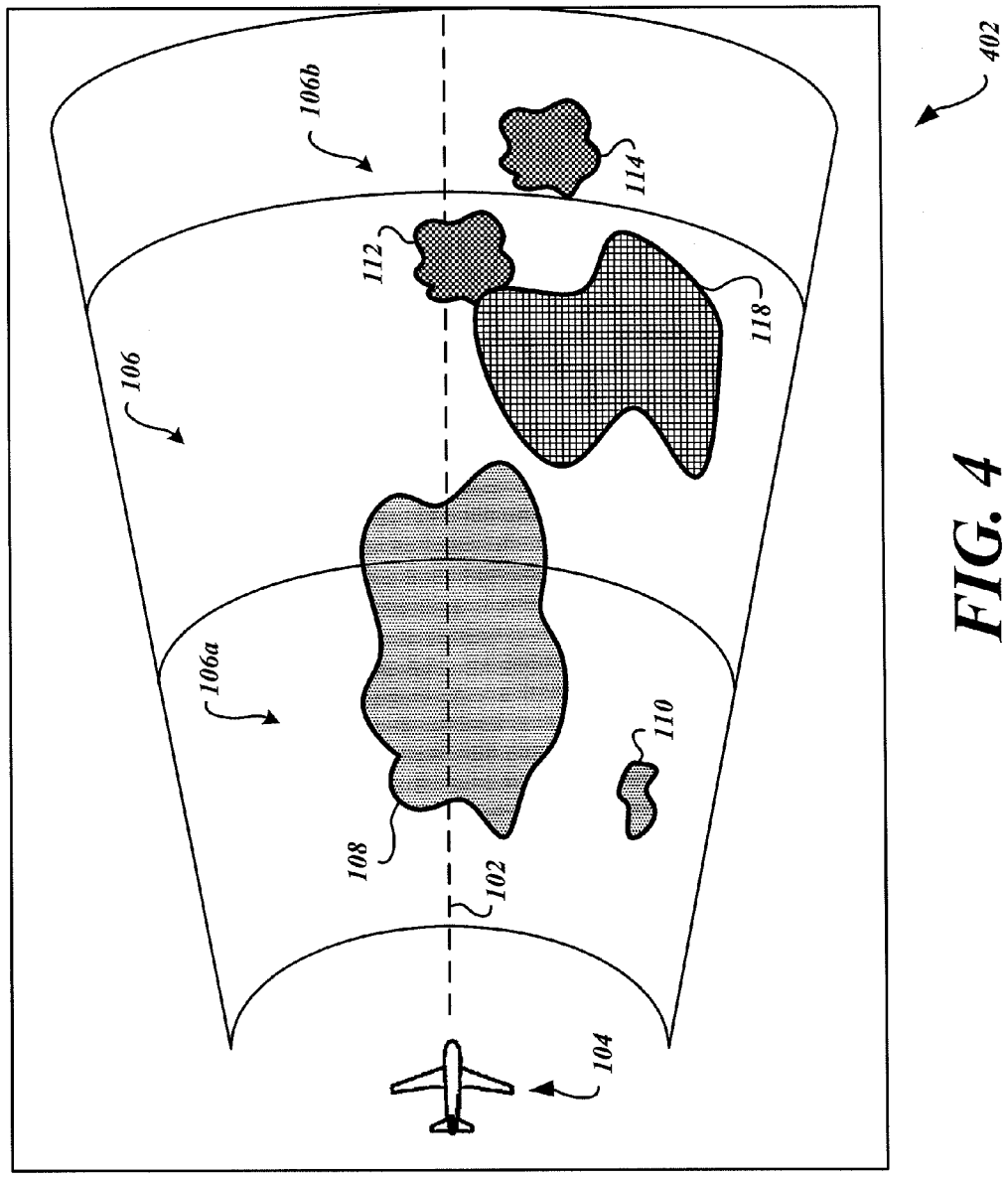
FIG. 4 is a display image presenting a weather radar display of the planned flight path through the plurality of storm cells based upon the installation aircraft's onboard weather radar system and information received from the ground-based weather radar system.

FIG. 4 is a display image presenting a weather radar display 402 of the planned flight path 102 through the plurality of storm cells 108, 110, 112, 114 based upon the installation aircraft's onboard weather radar system 310 and the ground-based weather radar information. Similar to FIG. 1, reference numerals of the icons of FIG. 4 correspond to the reference numerals of FIG. 1.

The weather radar display 402 in the installation aircraft 104 includes a display of the storm cells 108, 110 detected by its onboard weather radar system 310 (FIG. 3). In the ambiguity region 106b (which may be optionally shown on the display), the storm cell 112 detected by the weather radar system 310 is verified by the comparison with the NEXRAD weather information. An icon 112 corresponding to the storm cell 112 is generated and displayed on the radar display 402. The icon 112 corresponding to the storm cell 112 may be based upon the verified weather radar return information, upon information in the received ground-based weather radar information, or a combination of both sources of information.

Further, since the storm cell 114 is blocked by the mountain range 118, the ground-based weather radar information can be used to generate and display an icon 114 on the radar display 402 corresponding to the storm cell 114. Accordingly, the crew of the installation aircraft 104 is aware of the existence of the storm cell 114. In some embodiments, a line type, a line color, a fill color, and/or a fill pattern, may be used to differentiate displayed icons that are based upon weather radar returns detected by the weather radar system 310 and weather radar returns detected by the ground-based weather radar station 120.

In some embodiments, an icon 118 corresponding to the mountain range 118 is generated and displayed on the radar display 402. Accordingly, the crew of the installation aircraft 104 is aware of the relative position of the storm cells 112, 114 to the location and/or elevation of the mountain range 118.

In some embodiments, radar information from the weather radar system 310 and information from the weather radar returns detected by the ground-based weather radar station 120 may be combined. In an exemplary embodiment, the reflectivity information from the on board weather radar system 310 (OB reflectivity) is blended with the reflectivity information in the received ground-based weather radar information (GB Reflectivity), such that a blended reflectivity (BF) is determined in accordance with Equation 1. The blended reflectivity information is then used to generate the weather that is displayed on the radar display 402.

$$BR = \beta*(OB \text{ Reflectivity}) + (1-\beta)*(GB \text{ Reflectivity}) \quad \text{Eq. 1}$$

Depending upon the embodiment, the blending of reflectivity information may be based on 3-D or 2-D data. Blending of the reflectivity information may be applied to any type of reflectivity information, such as, but not limited to, precipitation, turbulence, icing, and other detectable weather.

The blending factor β corresponds to the selected amount or degree of blending of the onboard reflectivity and ground-based weather radar reflectivity values. Any blending factor β may be used, and the blending factor β may be adjustable. In one application, the blending factor β is adjusted as a function of range out from the installation aircraft 104, or may be based upon the resolution of the reflectivity information received from the weather radar system 310. For example, the value of β would be closer to 1.0 if the resolution of the onboard reflectivity data is significantly higher than the resolution of the ground-based weather radar reflectivity data, or if the reflectivity data was closer to the installation aircraft 104. Thus, onboard reflectivity data returned from weather with higher resolution, and/or that is relatively close to the installation aircraft 104, would be more heavily weighted than the corresponding ground-based weather radar reflectivity data.

Other criteria may be used to define the blending factor β. The relative signal-to-noise ratio of the on board reflectivity data versus the ground-based weather radar reflectivity data may be used to determine the blending factor β. The percentage of the on board reflectivity data blocked by terrain may be used to determine the blending factor β (the less that the on board reflectivity data is blocked, the closer β is to 1). The relative attenuation of the transmitted pulse of the on board reflectivity data versus the ground-based weather radar reflectivity data attenuation due to intervening weather may be used to determine the blending factor β. Time may be used to determine the blending factor β (so as to ensure no sharp temporal jumps from an "all GB result" to an "all OB result").

The blending factor β may be determined for data points individually based on one or more of the above-described factors. For example, reflectivity data at different elevations and/or at different ranges out from the installation aircraft 104 may have different blending factors β. Further, the blending factor β may scaled in accordance with a selected function, such as, but not limited to, different elevations and/or at different ranges out from the installation aircraft 104.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method that compares onboard weather radar returns and ground-based weather radar information, the method comprising:
   receiving a radar return from a weather radar system on board an installation vehicle;
   receiving the ground-based weather radar information;
   comparing a location of the radar return received from the onboard weather radar system with a corresponding location in the received ground-based weather radar information; and
   determining that the radar return received from the onboard weather radar system is a weather radar return when a location in the received ground-based weather radar information indicates a presence of weather at the location of the radar return.

2. The method of claim 1, further comprising:
   generating a radar image showing the weather radar return; and
   displaying the radar image on a display.

3. The method of claim 2, wherein generating the radar image showing the weather radar return comprises:
   generating an icon corresponding to the weather return based upon the radar return received from the onboard weather radar system in response to a correlation between the location of the weather radar return and the ground-based weather radar information.

4. The method of claim 2, wherein generating the radar image showing the weather radar return comprises:
   generating an icon corresponding to the weather radar return based upon the received ground-based weather radar information.

5. The method of claim 1, further comprising:
   determining that the radar return received from the onboard weather radar system is a terrain radar return when the received ground-based weather radar information indicates an absence of weather at the location of the radar return.

6. The method of claim 5, further comprising:
   generating a radar image showing the terrain radar return; and
   displaying the radar image on a display.

7. The method of claim 1, wherein the ground-based weather radar information includes location information of weather detected at a ground-based weather radar station, and wherein the location of the weather detected by the ground-based weather radar station is compared with a location of the radar return received from the onboard weather radar system.

8. The method of claim 1, further comprising:
   determining a region of space blocked by terrain, wherein the onboard weather radar system cannot detect weather in the region of space blocked by the terrain;
   identifying weather in the region of space blocked by terrain based upon the received ground-based weather radar information;
   generating an icon corresponding to the weather in the region of space blocked by terrain based upon the received ground-based weather radar information; and
   displaying the icon on a display.

9. The method of claim 1, further comprising:
   determining a region of space beyond a radar horizon of the onboard weather radar system, wherein the onboard weather radar system cannot detect weather in the region of space beyond the radar horizon;
   identifying weather in the region of space beyond the radar horizon based upon the received ground-based weather radar information;
   generating an icon corresponding to the weather in the region of space beyond the radar horizon based upon the received ground-based weather radar information; and
   displaying the icon on a display.

10. The method of claim 1, wherein comparing the location of the radar return received from the onboard weather radar system with the corresponding location in the received ground-based weather radar information comprises:
    comparing radar return intensity information received from the onboard weather radar system with a corresponding weather radar return intensity information in the ground-based weather radar information.

11. The method of claim 10, further comprising:
storing the radar return intensity information received from the onboard weather radar system as weather information in a weather information database when the radar return intensity information received from the onboard weather radar system corresponds to the weather radar return intensity information in the received ground-based weather radar information.

12. The method of claim 1, further comprising:
generating blended radar information based upon the radar information received from the onboard weather radar system and the ground-based weather radar information, wherein the blended radar information is based upon a blending factor $\beta$; and
generating a radar image based upon the blended radar information.

13. The method of claim 1, wherein comparing the location of the radar return received from the onboard weather radar system with the corresponding location in the received ground-based weather radar information comprises:
generating a first icon based upon radar return intensity information received from the onboard weather radar system;
generating a second icon based upon the received ground-based weather radar information; and
comparing the first icon with the second icon.

14. The method of claim 13, further comprising:
displaying the first icon on a display when the first icon corresponds to the second icon.

15. An onboard weather radar system in an installation vehicle, comprising:
an onboard weather radar antenna that detects a radar return from weather and from terrain;
an onboard transceiver that receives ground-based weather radar information;
an onboard processing system coupled to the onboard weather radar antenna and the onboard transceiver, wherein the onboard processing system compares a location of the radar return received from the onboard weather radar system with a corresponding location in the received ground-based weather radar information, and determines that the radar return received from the onboard weather radar system is a weather radar return when a location in the received ground-based weather radar information indicates a presence of weather at the location of the radar return.

16. The onboard weather radar system of claim 15, further comprising:
a memory with a weather information database, wherein intensity information for the radar return and the location information for the radar return is stored into the weather information database, and wherein the intensity information and the location information for the radar return is retrieved from the weather information database for the comparison with the ground-based weather radar information.

17. The onboard weather radar system of claim 15, further comprising:
a memory with a weather information database, wherein intensity information for the radar return and the location information for the radar return is stored into the weather information database in response to determining that the radar return is from weather.

18. The onboard weather radar system of claim 15, further comprising:
a memory with a terrain information database storing terrain location information and terrain elevation information for terrain;
a global positioning system (GPS) configured to determine a current location of the installation vehicle; and
a weather radar display that displays a radar image generated by the processor system,
wherein the processor system compares the terrain location information with the current location of the installation vehicle and an effective detection range of the onboard weather radar antenna,
wherein the processor system, based upon the effective detection range of the onboard weather radar antenna, and based upon the terrain location information and the terrain elevation information, identifies a blocked region of space that cannot be detected by the onboard weather radar antenna, and
wherein ground-based radar return information from one of the plurality of ground-based weather radar returns located in the blocked region is included in the radar image.

19. An onboard weather radar system in an installation vehicle, comprising:
means for receiving a radar return from a weather radar antenna on board the installation vehicle;
means for receiving ground-based weather radar information; and
means for comparing a location of the radar return received from the onboard weather radar system with a corresponding location in the received ground-based weather radar information, and for determining that the radar return received from the onboard weather radar system is a weather radar return when a location in the received ground-based weather radar information indicates a presence of weather at the location of the radar return.

20. The onboard weather radar system of claim 19, wherein the means for comparing and determining further determines that the radar return received from the onboard weather radar system is a terrain radar return when the location of the radar return fails to correspond to the presence of weather in the received ground-based weather radar information.

* * * * *